US012718455B2

(12) United States Patent
Kim

(10) Patent No.: US 12,718,455 B2
(45) Date of Patent: Aug. 25, 2026

(54) WEB PLATFORM BASED GARMENT SIMULATION AND RENDERING

(71) Applicant: CLO Virtual Fashion Inc., Seoul (KR)

(72) Inventor: Tae Hyeong Kim, Seoul (KR)

(73) Assignee: CLO Virtual Fashion Inc., Gangnam-gu (KR)

( * ) Notice: Subject to any disclaimer, the term of this patent is extended or adjusted under 35 U.S.C. 154(b) by 160 days.

(21) Appl. No.: 18/432,074

(22) Filed: Feb. 5, 2024

(65) Prior Publication Data

US 2024/0177393 A1 May 30, 2024

Related U.S. Application Data

(63) Continuation-in-part of application No. PCT/KR2022/011469, filed on Aug. 3, 2022.

(30) Foreign Application Priority Data

Aug. 3, 2021 (KR) ........................ 10-2021-0101707

(51) Int. Cl.
*G06T 15/00* (2011.01)
*G06T 19/20* (2011.01)

(52) U.S. Cl.
CPC .............. *G06T 15/00* (2013.01); *G06T 19/20* (2013.01); *G06T 2200/24* (2013.01); *G06T 2210/16* (2013.01)

(58) Field of Classification Search
None
See application file for complete search history.

(56) References Cited

U.S. PATENT DOCUMENTS 10,204,375 B2 2/2019 Su et al.
11,308,687 B1 * 4/2022 Liang ...................... G06T 13/40
(Continued)

FOREIGN PATENT DOCUMENTS

CN 103714466 A 4/2014
CN 108805648 A 11/2018
(Continued)

OTHER PUBLICATIONS

Extended European Search Report of the corresponding EP 22853453.3 mailed on Nov. 29, 2024.
(Continued)

*Primary Examiner* — Sarah Le
(74) *Attorney, Agent, or Firm* — WTA IP Law P.C.

(57) ABSTRACT

Provided is an operating method of a web platform which drives a viewer showing a simulated garment. The operating method includes rendering a three-dimensional (3D) garment and displaying the 3D garment on the viewer based on geometry information and material information on a 3D garment model, for which a draping simulation has been completed in a server, determining an object to be edited corresponding to a specific point among a plurality of objects constituting the 3D garment, based on a user input indicating the specific point of the 3D garment, receiving a user setting for changing material information on the object to be edited, changing the material information on the object to be edited, based on material information corresponding to the user setting, and displaying a changed 3D garment on the viewer by performing rendering of applying the changed material information to the 3D garment.

21 Claims, 9 Drawing Sheets

(56) References Cited

U.S. PATENT DOCUMENTS

| | | | | |
|---|---|---|---|---|
| 2012/0313969 | A1 | 12/2012 | Szymczyk et al. | |
| 2014/0114620 | A1* | 4/2014 | Grinspun | A41H 3/007 703/1 |
| 2015/0134302 | A1 | 5/2015 | Chhugani et al. | |
| 2015/0279098 | A1 | 10/2015 | Kim et al. | |
| 2016/0180391 | A1* | 6/2016 | Zabaneh | G06F 16/9535 705/14.58 |
| 2016/0180449 | A1 | 6/2016 | Naware et al. | |
| 2016/0335690 | A1 | 11/2016 | Beaver et al. | |
| 2021/0056755 | A1 | 2/2021 | Oh et al. | |
| 2022/0361612 | A1* | 11/2022 | Park | G06Q 50/04 |

FOREIGN PATENT DOCUMENTS

| | | | |
|---|---|---|---|
| CN | 112084670 | A | 12/2020 |
| CN | 113010948 | A | 6/2021 |
| KR | 10-1519123 | B1 | 5/2015 |
| KR | 10-2015-0113309 | A | 10/2015 |
| KR | 10-2016-0117017 | A | 10/2016 |
| KR | 10-2021-0021898 | A | 3/2021 |

OTHER PUBLICATIONS

International Search Report of PCT/KR2022/011469 mailed on Nov. 4, 2022.

Written Opinion of the International Searching Authority of PCT/KR2022/011469 completed on Nov. 4, 2022.

* cited by examiner

WEB PLATFORM BASED GARMENT SIMULATION AND RENDERING

CROSS-REFERENCE TO RELATED APPLICATIONS

This is a bypass continuation-in-part application of International PCT Application No. PCT/KR2022/011469 filed on Aug. 3, 2022, which claims priority to Republic of Korea Patent Application No. 10-2021-0101707 filed on Aug. 3, 2021, which are incorporated by reference herein in their entirety.

TECHNICAL FIELD

This disclosure relates to an operating method of a web platform that interacts with a viewer on a user terminal and a web server.

BACKGROUND ART

Various types of garment simulation software are used to provide simulation yet to be fabricated. However, simulation images produced by such garment simulation software has a large file size, much time and storage capacity are spent for a user to receive and view the simulation images through an application, especially when the simulation images are transmitted through the Internet. In addition, the simulation images may not be reproduced smoothly when the capacity or processing power of a user terminal is inadequate. Further, it may take a lot of time and resources to partially correct the simulation images provided via the Internet because the garment simulation has to be performed again to reflect the correction.

SUMMARY

Embodiments relate to simulating garment where a simulation result of draping a three-dimensional (3D) garment is received by a web server. A first version of the 3D garment is rendered by the web server according to the simulation result and first material information of an object of the 3D garment to generate a first rendering result. The first rendering result is sent to a user terminal for displaying the first version of the 3D garment on the user terminal. A user input indicating the object of the 3D garment for editing and a user setting for changing the first material information to second material information are received via the user terminal. A second version of the 3D garment according to the simulation result and the second material information of the object of the 3D garment are rendering by the web server to generate a second rendering result. The second rendering result is sent to the user terminal for displaying the second version of the 3D garment on the user terminal.

In one or more embodiments, the first and second material information includes at least one of a color of the 3D garment, texture of fabric of the 3D garment, a light effect on the fabric of the 3D garment, a pattern of the fabric of the 3D garment, a position and a size of a pattern displayed on the fabric of the 3D garment, a type of a supplemental material attached to the 3D garment, or a position and a size of the supplemental material.

In one or more embodiments, geometry information of the 3D garment model and the first material information are loaded from a simulation result onto the web server.

In one or more embodiments, the object includes a pattern or a supplemental material constituting the 3D garment.

In one or more embodiments, the user input indicates a specific point of the 3D garment that corresponds to the object of the 3D garment for editing.

In one or more embodiments, the specific point is determined based on positions of vertices of polygons included in a mesh constituting the 3D garment.

In one or more embodiments, one of objects of the 3D garment over which a mouse point hovers is displayed on the user terminal in a distinctive manner relative to other objects of the 3D garment.

In one or more embodiments, a silhouette of the object for editing to be displayed on the user terminal in a distinctive manner relative to other objects of the 3D garment.

In one or more embodiments, the user setting is received via a user interface on the user terminal for editing the first material information to the second material information.

In one or more embodiments, the user interface displays a material list comprising a plurality of material items to be selected for the object.

In one or more embodiments, the second version of the 3D garment rendered using the second material information is stored.

In one or more embodiment, a file comprising the second version of the 3D garment and the second material information is generated. The file is sent to a simulation server that generated the simulation result.

DETAILED DESCRIPTION OF EMBODIMENTS

Figure 1:
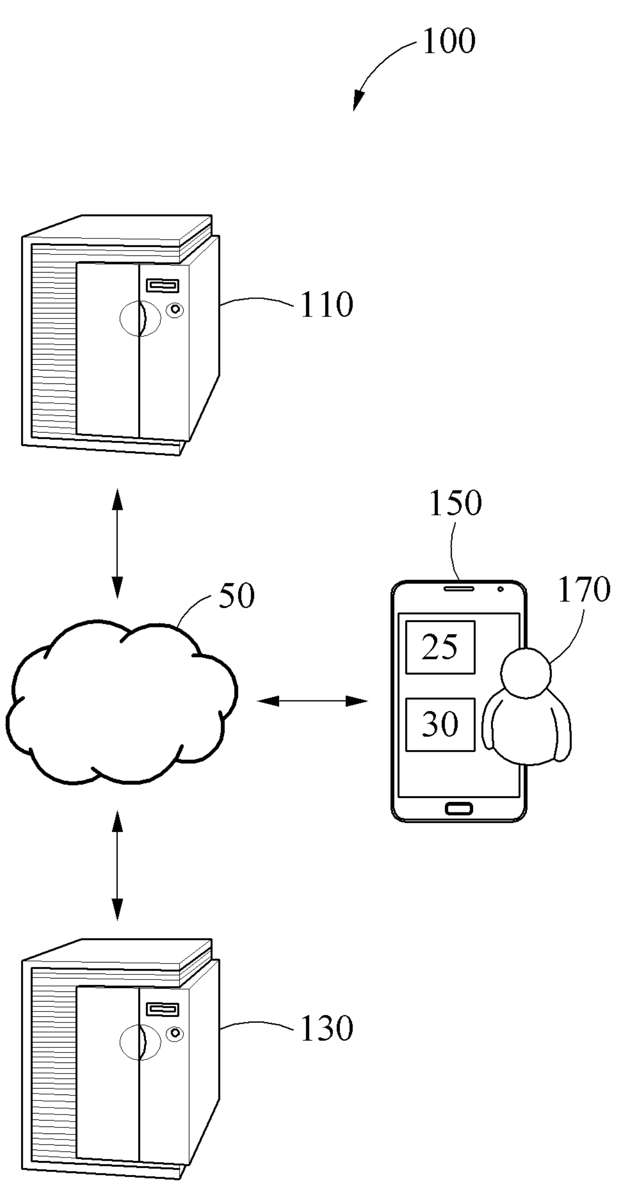
FIG. 1 is a block diagram illustrating a network environment of a web platform, according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

FIG. 1 is a block diagram illustrating network environment 100 of a web platform, according to an example embodiment. FIG. 1 illustrates a network environment 100 in which a simulation server 110, a web server 130, and a user terminal 150 are connected to each other through a communication network 50, according to an example embodiment. The web platform refers to a collection of the web server 130 and the user terminal 150.

The simulation server 110 may provide a three-dimensional (3D) garment model corresponding to a simulation result to the user terminal 150 by performing various garment draping simulations. The simulation result may indicate changes in the configuration of meshes that constitute the 3D garment model with progression of time steps. The simulation server 110 may interoperate with an application program installed on the web server 130 and/or the user terminal 150 to generate a user interface (UI), perform functions or operations, or provide a service. The simulation result may represent a draping simulation result image of the 3D garment model, but is not limited thereto. The simulation server 110 may also be referred to as a "server" herein.

The simulation server 110 may be, for example, a single server computer or a system similar thereto or one or more server banks or a plurality of servers of certain arrangements. The simulation server 110 may be in a single facility or may be a server "cloud" distributed among many different geographical positions.

Figure 4:
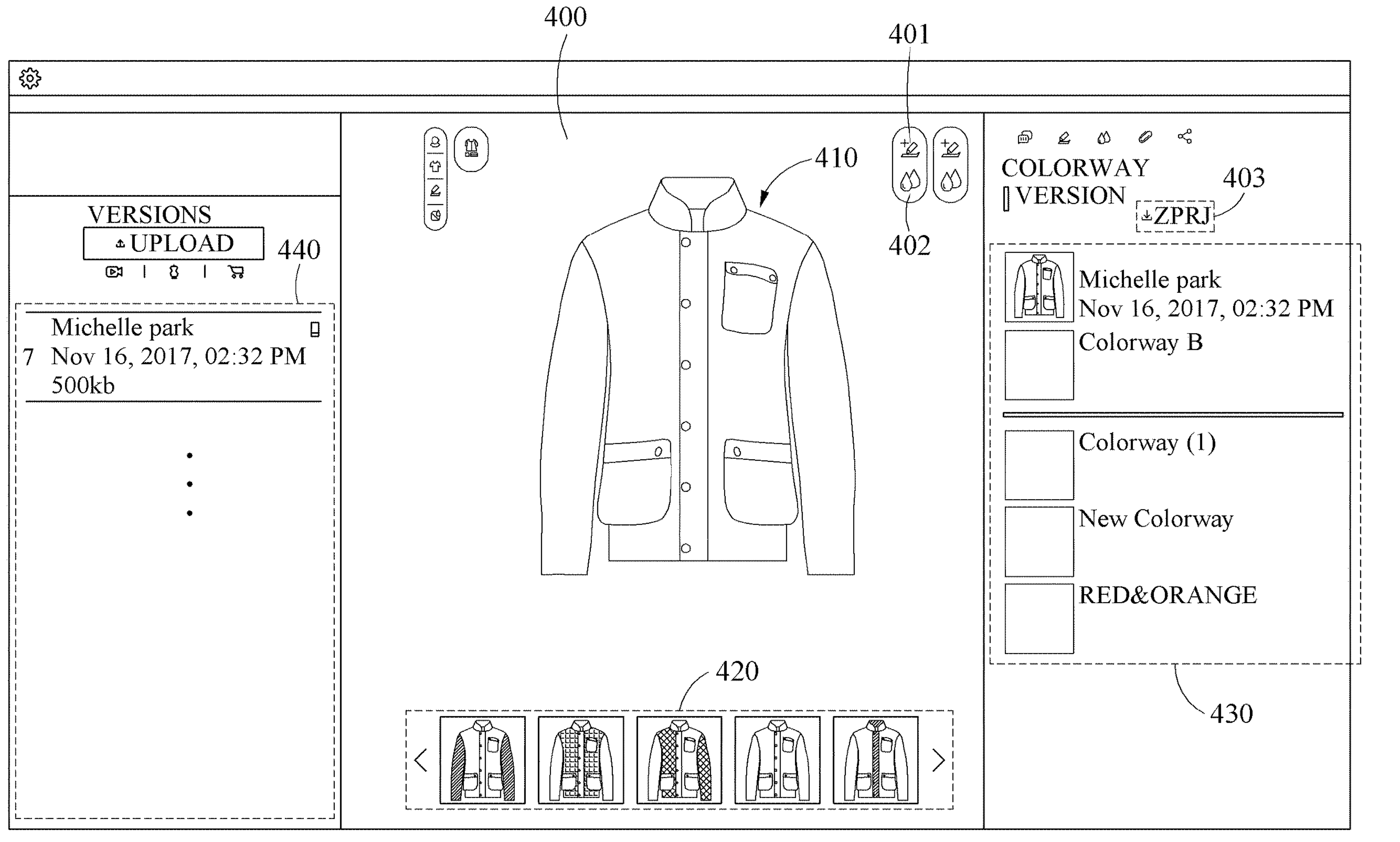
FIG. 4 is a diagram illustrating a screen of a viewer displaying a three-dimensional (3D) garment, according to an example embodiment.
Figure 5:
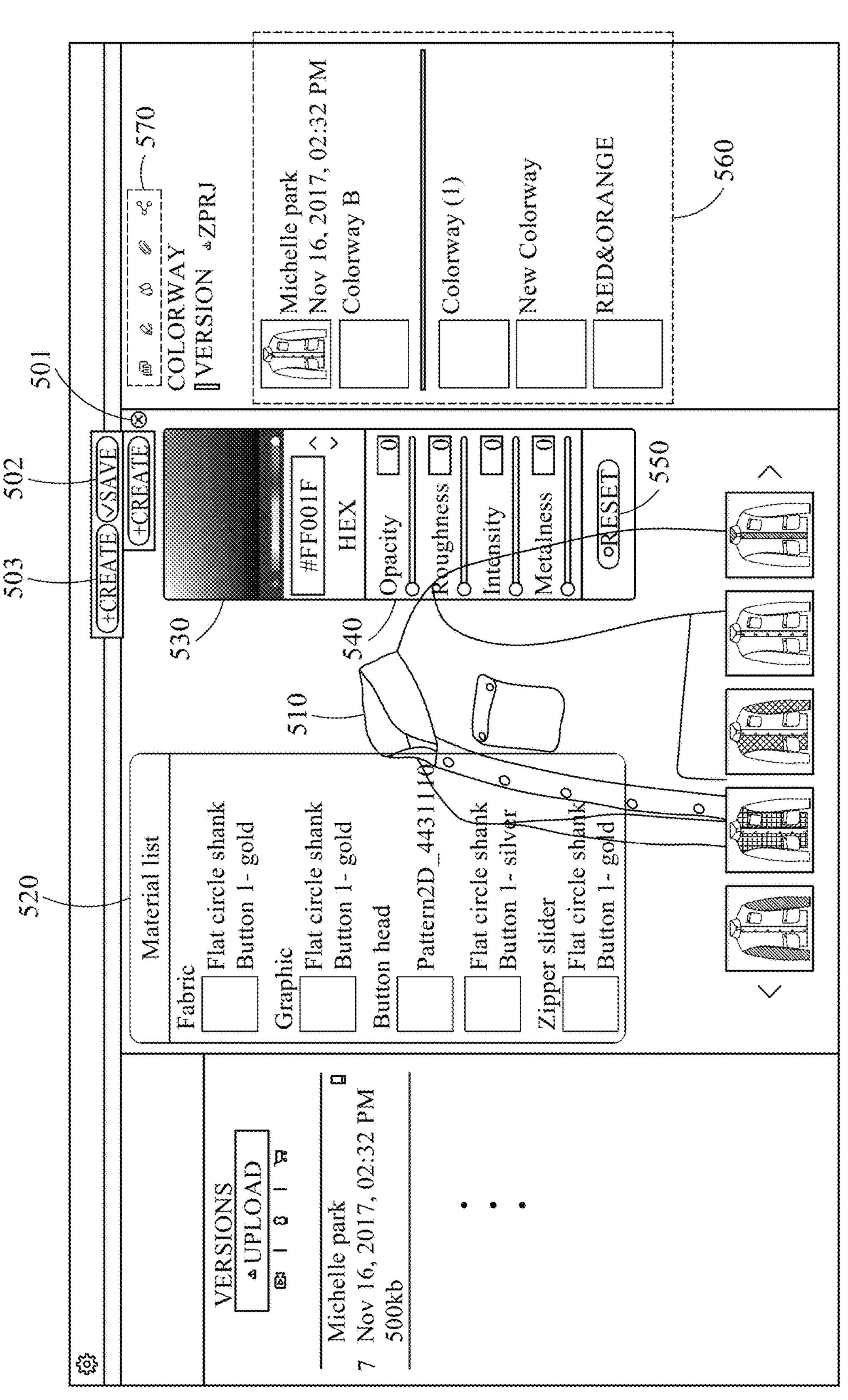
FIG. 5 is a diagram illustrating a start screen of a configurator for editing material information on a 3D garment, according to an example embodiment.
Figure 6:
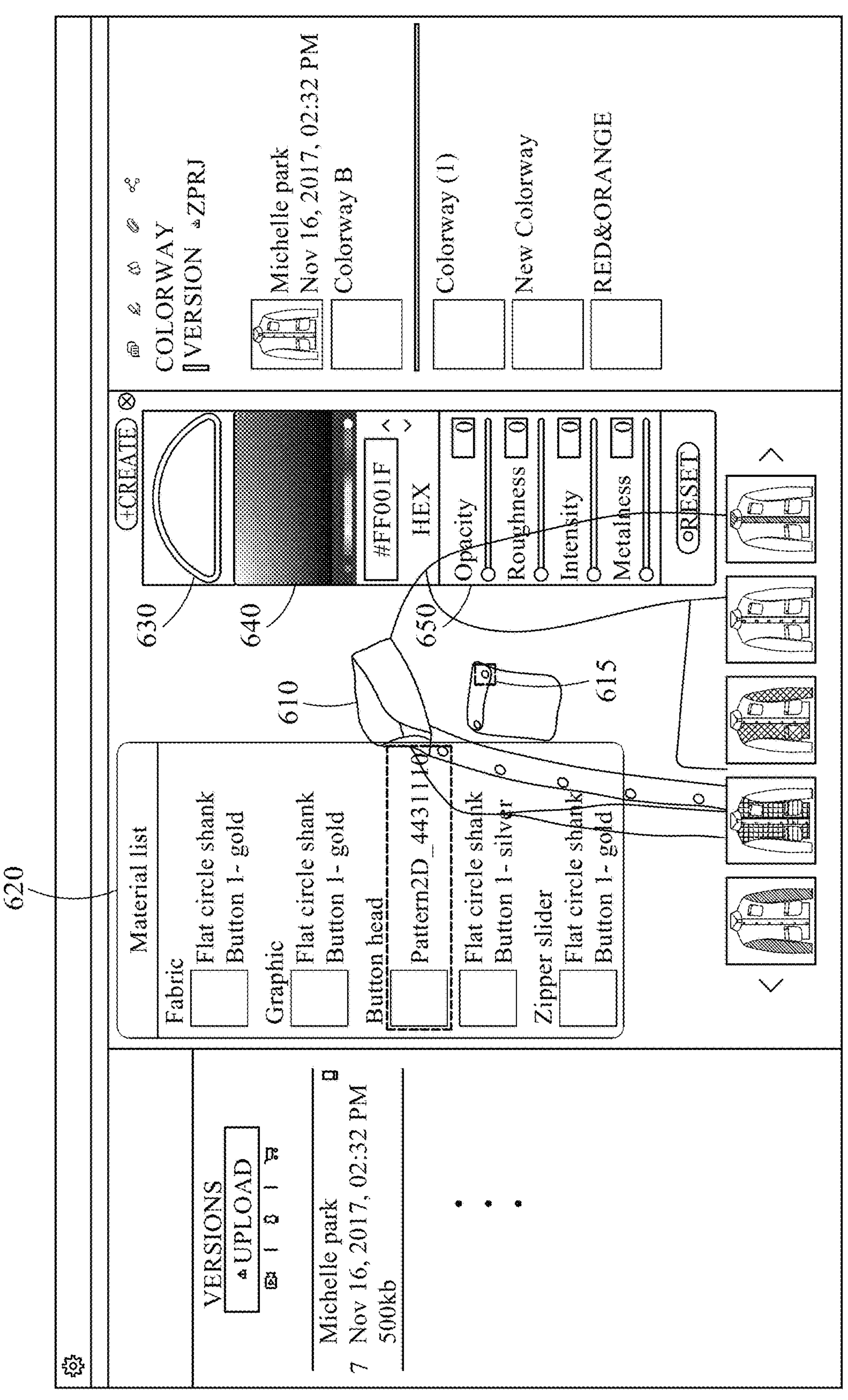
FIG. 6 is a diagram illustrating a method for a configurator to determine an object to be edited, according to an example embodiment.
Figure 7:
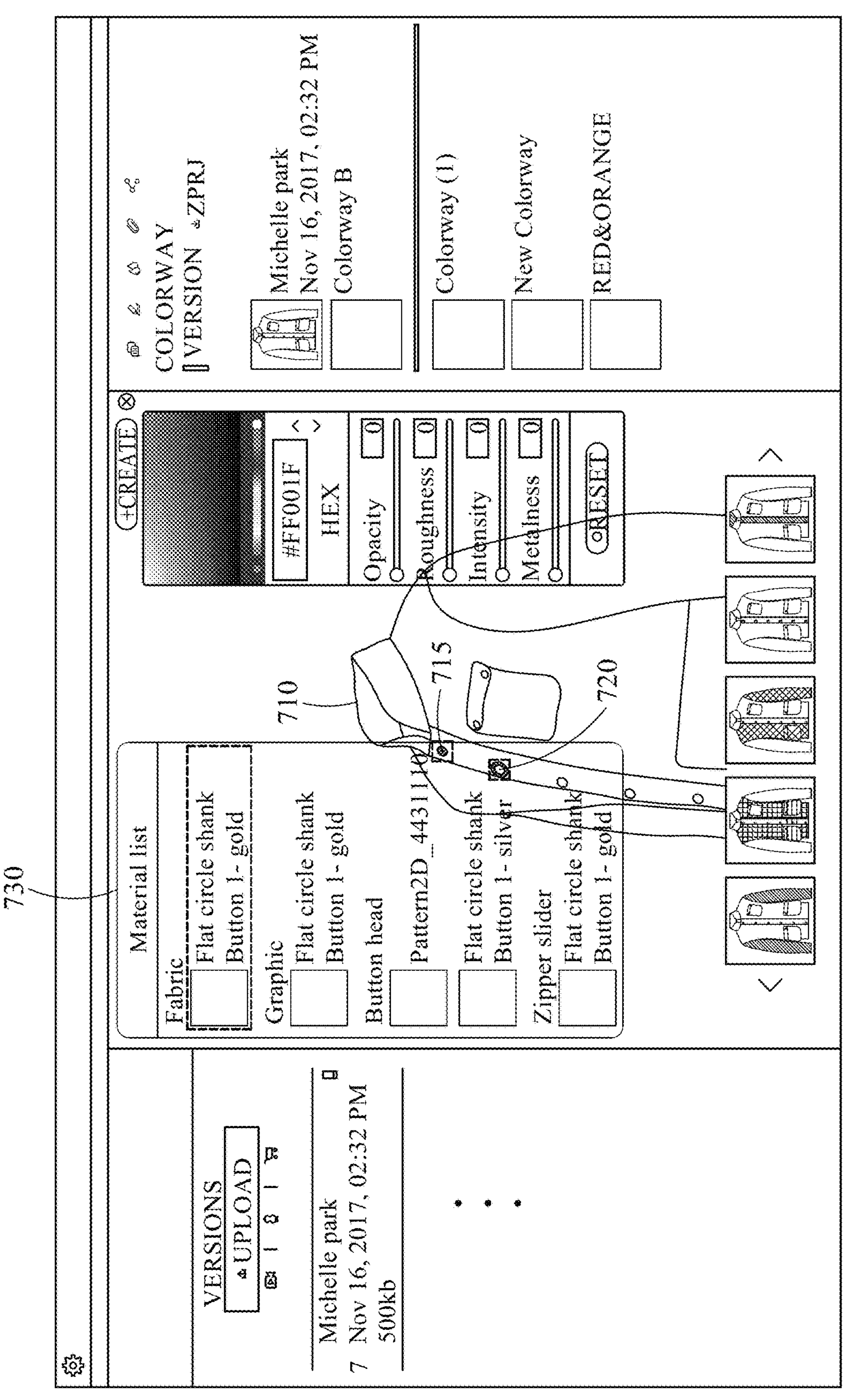
FIG. 7 is a diagram illustrating an operation of a configurator when a mouse hovering event occurs in a 3D garment, according to an example embodiment.

The web server 130 may, for example, provide a web platform which drives a viewer 25 for displaying a 3D garment on the user terminal 150, as shown in FIG. 4 below, and/or a configurator 30 for editing a 3D garment displayed on the viewer, as shown in FIGS. 5 to 7 below. The viewer 25 may be embodied as software executed on the user terminal 150. For this purpose, the user terminal 150 may include a processor, non-transitory memory storing instructions for executing the viewer 25, and a networking circuit for communicating with the web server 130. The web server 130 may interact with the user terminal 150 using at least one protocol that enables bidirectional communication.

The web server 130 may render the 3D garment and display the 3D garment on the viewer 25 executed on the user terminal 150, based on (i) geometry information of a 3D garment model, for which draping simulation has been completed in the simulation server 110, and (ii) material information on the 3D garment model. The 3D garment model may be in the form of, for example, a mesh including a plurality of polygons such as triangles. When a garment is represented as a polygonal mesh is draped over a 3D avatar and/or a 3D character, a natural 3D garment model based on the law of physics may be simulated.

The viewer 25 may display a 3D garment corresponding to the 3D clothes model, for which the draping simulation has been completed in the simulation server 110. In this case, the 3D garment may be, for example, a virtual garment for a 3D virtual character or a virtual garment for a 3D virtual avatar.

The geometry information on the 3D garment model may correspond to information for configuring a skeleton of the 3D garment model, that is, a structure and/or a shape of the 3D garment model. The geometry information on the 3D garment model may be classified, for example, by a plurality of garment patterns constituting the 3D garment model or body parts of an avatar corresponding to respective garment patterns. The geometry information on the 3D garment model may be included in a file or a plurality of files, each corresponding to a garment pattern or a body part of the avatar.

The material information on the 3D garment model may include a color of the 3D garment model, texture of fabric of the 3D garment model, a light effect of the fabric, a pattern of the fabric, a position and a size of a pattern displayed on the fabric, a type of a supplemental material attached to the 3D garment model, a position and a size of the subsidiary material, and the like.

The configurator 30 may render a 3D garment corresponding to a simulation result (e.g., the 3D garment model) by applying new fabric information and/or new material information in addition to the material information on the 3D garment model loaded together with the 3D garment model, for which the draping simulation has been completed in the simulation server 110. The configurator 30 may also be software that is executed on the user terminal 150.

The configurator 30 may enable a user 170 to edit the 3D garment displayed on the viewer 25 in various ways. The configurator 30 may provide various functions to edit material information on the 3D garment in the viewer 25 interoperating with the web server 130. The 3D garment may be, for example, a virtual garment for a 3D virtual character or a virtual garment for a 3D virtual avatar. The 3D garment may be in the form of a mesh with a plurality of polygons such as triangles. For example, when a garment is represented as a polygonal mesh draped over a 3D avatar, a natural 3D virtual garment based on the law of physics may be simulated.

The configurator 30 may change material information on an object of the 3D garment. The object for editing in the 3D garment may correspond to a specific point of the 3D garment selected by the user 170 through the viewer 25, or an area of the 3D garment or the object to be edited for applying updated material information is to be applied may be selected by the user 170. Here, the “object for editing” or “object to be edited” may correspond to one of many objects in 3D garment whose material information is to be updated. The material information on the object to be edited may include, for example, a color of a 3D garment, texture of fabric of the 3D garment, a light effect of the fabric, a pattern of the fabric, a position and a size of a pattern displayed on the fabric, a type of a subsidiary material attached to the 3D garment, a position and a size of the subsidiary material, and the like, and is not limited thereto. The user 170 may select, edit, or change the object to be edited in the 3D garment in units of patterns or supplemental materials by operating through the configurator 30.

In order to enable the user 170 to change a color of a sleeve portion of a 3D garment from “red” to “blue” through the configurator 30, for example, a user interface of the configurator 30 may display options to select and/or change the color of the sleeve portion. The user interface may display a material list including a plurality of material items that may be set so that the user 170 may select and adjust various pieces of material information in addition to the color. The user interface may, for example, provide various elements for adjusting an impression of a garment obtained from color reflectivity or the like in the form of a slide bar such that the user 170 may select or change the elements, but is not limited thereto.

As will be described in more detail below with reference to FIG. 5, the user interface may further include a color palette (e.g., a color palette 530 in FIG. 5), a property list (e.g., a property list 540 in FIG. 5), a colorway list (e.g., a colorway list 560 in FIG. 5), and the like. The color palette may be provided to set or change a color of an object to be edited. The property list may be provided to set or change various property items related to colors, for example, opacity, roughness, intensity, metalness, and the like. The colorway list be a list including material information of a 3D garment model, having its simulation completed in the simulation server 110, and material information of a 3D garment generated using the configurator 30. In this case, the material information of the 3D garment model and/or 3D garment may be referred to as a colorway. The “colorway” may be understood as representing a variety of editable material information other than color. Hereinafter, the “colorway” and the “material information” are used interchangeably.

The user 170 may also change texture itself according to the material information and texture overlaid on the material information via various user interfaces described above.

The configurator 30 may render a result of changing a color of a sleeve portion of the 3D garment to blue and show the result on the viewer in real time. The configurator 30 may perform the rendering by using geometry information of a 3D garment model loaded from the simulation server 110 as the geometry information of the 3D garment, while applying the material information changed for an area set by the user 170, and thereby enables rapid providing of an edited result desired by the user 170 with less processing power.

The configurator 30 may generate updated information on the 3D garment having the sleeve portion changed to blue, in the form of a file and upload the information to the simulation server 110. The configurator 30 may provide the updated information to the web server 130 for newly rendering the 3D garment. The updated information may be provided also to the simulation server 110 in the form of a file such that the result edited via the web platform is reflected in the simulation server 110.

The simulation server 110 may combine material information (colorway) on the 3D garment model stored in advance, with the file uploaded by the configurator and store material information (colorway) on the 3D garment model having the sleeve portion changed to blue.

In addition, the configurator 30 may set a name of a colorway file created in the process of editing the material of the 3D garment or delete the file. Also, the configurator may download information (e.g., geometry information and/or material information) used to render the 3D garment from the simulation server 110. The functions of the configurator 30 will be described in more detail with reference to FIGS. 5 to 7 below.

The web server 130 may change the material information on the 3D garment displayed on the viewer 25 according to setting or an input of the user 170 received via the configurator 30. The web server 130 may perform the rendering of applying the changed material information to the 3D garment to display the changed 3D garment on the viewer 25.

An operation performed between the web server 130 and the simulation server 110 will be described in more detail with reference to FIG. 2 below.

The user terminal 150 may provide a 3D garment corresponding to a 3D garment model provided by the simulation server 110 to the user 170 using a viewer 25 and/or a configurator 30 provided via an application and/or a web browser installed in the user terminal 150, receive items to be changed for the 3D garment, and provide the items to the web server 130.

The user terminal 150 may include a display, a memory, a processor, and a communication interface. The user terminal 150 may include, for example, a personal computer (PC), a netbook computer, a laptop computer, a personal digital appliance (PDA), a smartphone, a wearable device, and various devices for performing a similar function.

Figure 2:
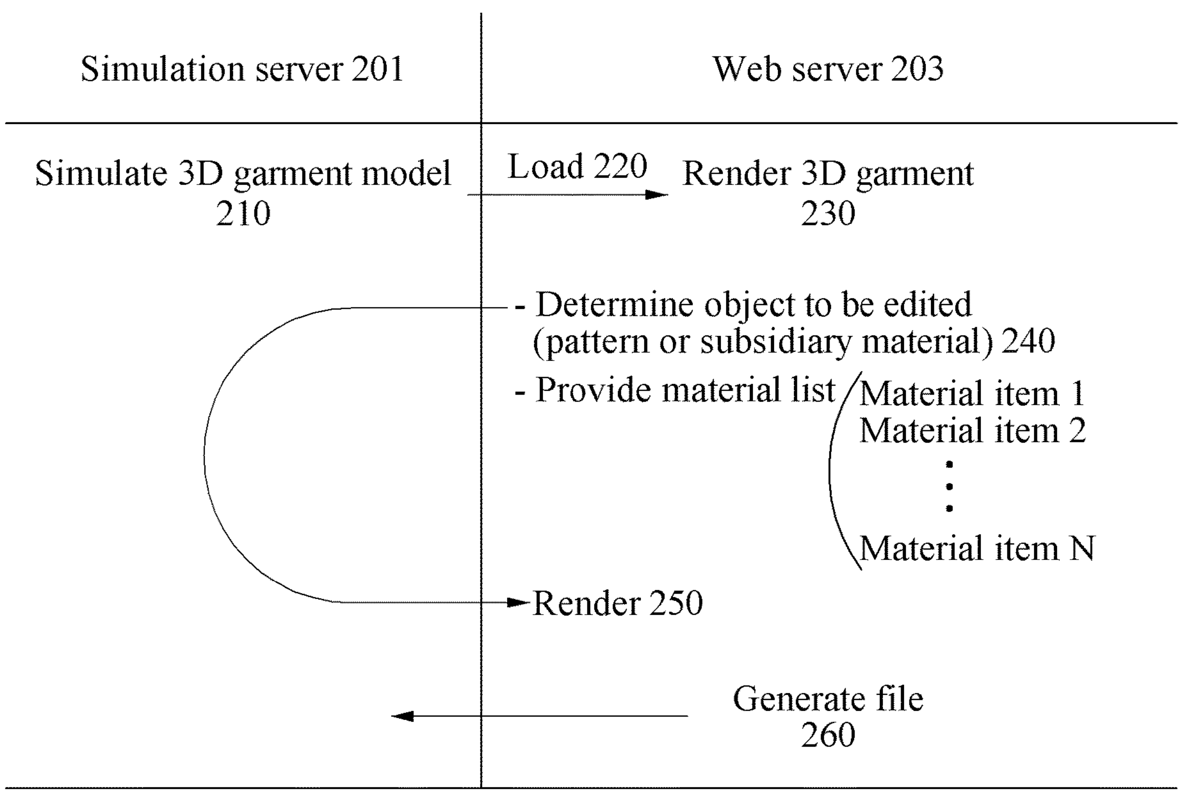
FIG. 2 is an interaction diagram illustrating an operation performed in a simulation server and a web server, according to an example embodiment.

FIG. 2 illustrates operations performed between a simulation server 201 and a web server 203, according to an example embodiment. The simulation server 201 may be, for example, the simulation server 110, described above with reference to FIG. 1. The web server 203 may be, for example, the web server 130, described above with reference to FIG. 1.

By performing operation 210, it is assumed that the simulation server 201 has completed a draping simulation for a 3D garment model. In operation 220, the web server 203 may load geometry information and material information on the 3D garment model, for which the draping simulation has been completed, from the simulation server 201.

In operation 230, the web server 203 renders the 3D garment and display the 3D garment on the viewer, based on the loaded geometry information and material information on the 3D garment model. Unlike the simulation server 201 that performs computing-heavy simulation operations of the 3D garment model, the web server 203 does not perform a simulation, but may merely generate compressed image files corresponding to the simulation result. The compressed image files may be sent to the user terminal for quick decompression and display without using a significant amount of computing resources. In addition, the web server 203 may perform rendering quickly by using the geometry information on the 3D garment model loaded from the simulation server 201 as the geometry information on the 3D garment.

The viewer 25 operates based on real-time rendering technology instead of performing simulation. For example, when a user uploads various file formats such as zprj, zpac, obj, and fbx to the server, the server creates a (streaming) data format including rendering information, geometry information and/or texture images that the viewer can interpret. The viewer renders a 3D image in real time based on the data format.

In operation 240, the web server 203 may determine an object to be edited based on a user input indicating a specific point of the 3D garment. In this case, the object to be edited may be one or more patterns constituting the 3D garment, or may be supplemental materials such as prints, embroidery, lace, buttons, and zippers attached to the 3D garment. The web server 203 may receive a user input, via the user terminal, indicating a specific point of the 3D garment, and determine an object to be edited that occupies the specific point in the 3D garment, based on the geometry information on the 3D garment model. When the target to be edited (object to be edited) is identified in the 3D garment displayed on the viewer, the web server 203 may generate and send information related to various user interfaces (e.g., a material list, a color palette, a property list, etc.) to the user terminal so that the relevant user interfaces may be displayed on the user terminal for editing the material information of the object to be edited.

For example, the user may set values of a plurality of material items included in the material list, the color palette, and/or the property list. In this case, in operation 250, the web server 203 may load material information on the 3D garment model corresponding to the values of the material items set by the user from the simulation server 201 and perform the rendering by reflecting the settings of the user to the loaded material information.

In operation 260, the web server 203 may transmit a file generated as a result of the rendering in operation 250 to the simulation server 201. In this case, the file generated as a result of the rendering in operation 250 may include material information on the 3D garment set or changed by the user and/or information on the 3D garment, in which the changed material information is reflected.

The simulation server 201, having received the file generated as the result of the rendering in operation 250, may reflect the material information edited by the user in the 3D garment model.

Figure 3:
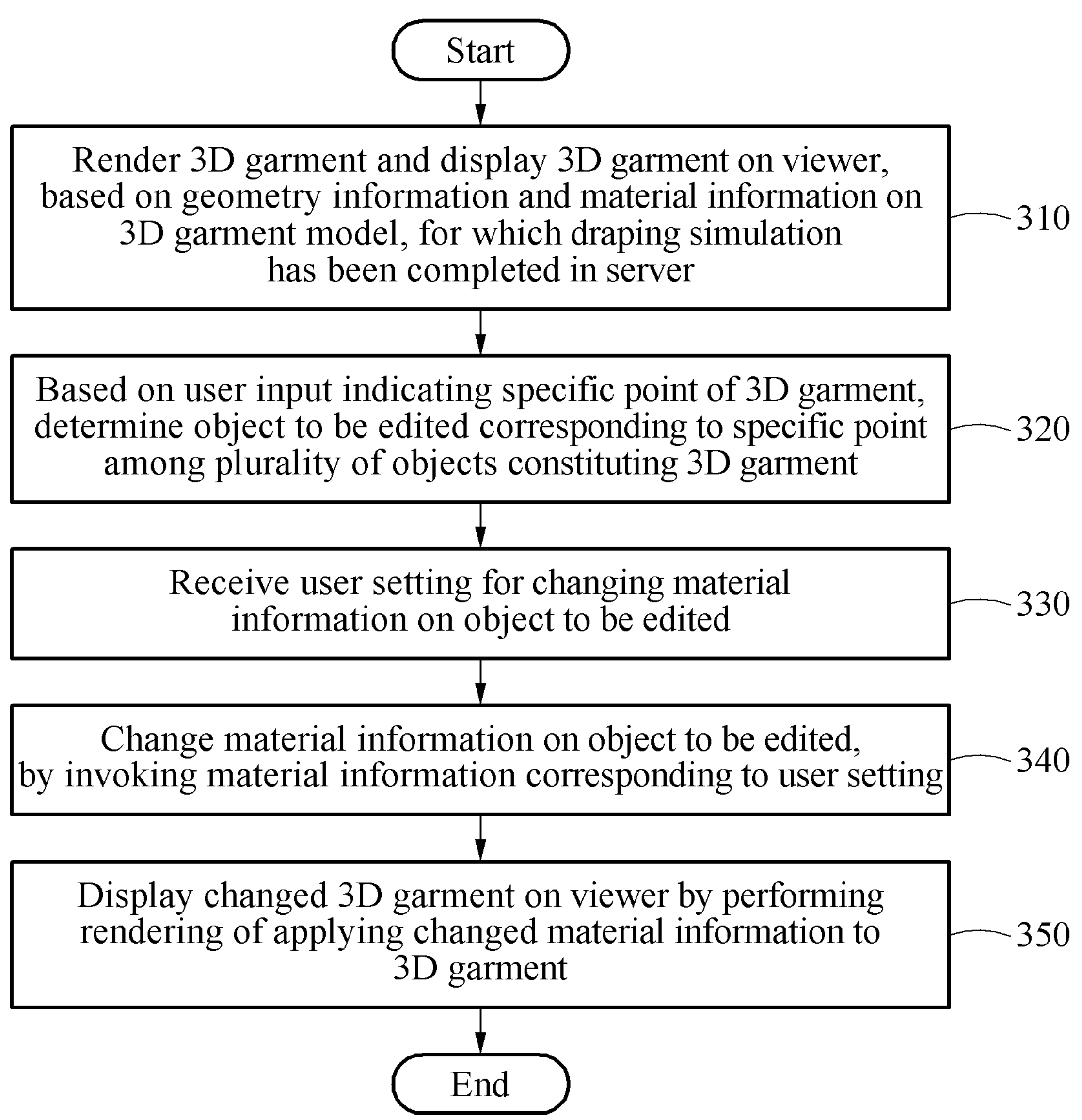
FIG. 3 is a flowchart illustrating an operating method of a web platform, according to an example embodiment.

FIG. 3 is a flowchart illustrating an operating method of a web platform, according to an example embodiment. In the following example embodiments, operations may be performed sequentially, but need not be so. For example, the order of the operations may be changed and at least two of the operations may be performed in parallel.

In operation 310, the web platform may render a 3D garment and display the 3D garment on the viewer 25 of the user terminal, based on geometry information and material information on a 3D garment model, for which a draping simulation has been completed in a server (e.g., the simulation server 110). The web platform may load the geometry information on the 3D garment model and the material information on the 3D garment model from the server, and render the 3D garment and display the 3D garment on the viewer, based on the loaded geometry information and material information. An example of a viewer screen displaying a 3D garment rendered by a web platform may be provided with reference to FIG. 4 below.

As described above, the "geometric information" may refer to information defining a shape and form of each portion of the 3D garment model. For example, when the 3D garment model is composed of a plurality of garment patterns, separate geometry information may be defined for each of the garment patterns of the 3D garment model or each of the body portions of an avatar corresponding to the garment patterns. For example, the geometry information may be configured as one file for each of the garment patterns constituting the 3D garment model or may include separate files divided per each of the plurality of garment patterns. The geometry information for each garment pattern may correspond to files different from each other.

The "material information" may include, for example, a color of a 3D garment model, fabric of the 3D garment model, a light effect of the fabric, a pattern of the fabric, a position and a size of a pattern displayed on the fabric, a type of a supplemental material attached to pieces of the 3D garment model, a position and a size of the subsidiary material, and the like, and is not limited thereto.

In operation 320, based on a user input indicating a specific point of the 3D garment displayed on the viewer in operation 310, the web platform may determine an object to be edited. Different objects of the 3D garment may be associated with different specific points, and by receiving indication of a specific point, a corresponding object may be identified and selected for editing. The plurality of objects may include at least one of one or more patterns or one or more supplemental materials constituting the 3D garment, and are not limited thereto.

In operation 320, the web platform may receive a user input indicating the specific point of the 3D garment. In this case, the specific point may be determined based on, for example, positions of vertices of polygons included in a mesh constituting the 3D garment. The web platform may determine, based on the geometry information, an object to be edited corresponding to the specific point among a plurality of objects constituting the 3D garment. The web platform may display a silhouette of the determined object to be edited in a manner distinguishable from other objects.

More specifically, as an event of a user input for the 3D garment displayed on the viewer occurs, the web platform may drive a configurator for editing the material information on the 3D garment to make it possible to change the material information on the editing material of the 3D garment. The functions of the configurator will be described in more detail with reference to FIGS. 5 to 7 below.

For example, when a mouse hovering event has occurred in the 3D garment displayed on the viewer, prior to determining an object to be edited, the web platform may display an area occupied by an object where the mouse hovering event has occurred in a manner distinguishable from areas occupied by other objects where the mouse hovering event has not occurred. The web platform may highlight the area (e.g., a surface of the object over which a mouse pointer is positioned) of the object in the display. When the object is determined as the object to be edited by a mouse click or the like on the highlighted object, the web platform may highlight an outline (or a silhouette) instead of the surface of the object to be edited. When the mouse is moved out of the object and the mouse hovering event ends the web platform may remove highlighting for the surface of the object. An operation of the configurator when the mouse hovering event has occurred will be described in more detail with reference to FIG. 7 below.

In operation 330, the web platform may receive a user setting for changing material information on the object to be edited determined in operation 320. The material information on the object to be edited may include, for example, a color of a 3D garment, texture of fabric of the 3D garment, a light effect of the fabric, a pattern of the fabric, a position and a size of a pattern displayed on the fabric, a type of a subsidiary material attached to the 3D garment, a position and a size of the subsidiary material, and the like, and is not limited thereto.

In operation 330, the web platform may provide a user interface for editing the material information corresponding to the object to be edited. The web platform may receive a user setting for changing the material information of the object to be edited via the user interface. The user interface may include, for example, a color palette and/or a property list, in addition to a material list including a plurality of material items configured to be set in response to the object to be edited. The web platform may receive a user setting for the material items included in the color palette and/or property list. For example, when a user wants to change material information on various objects in a 3D garment, the number of objects to be edited may be more than one. In this case, the web platform may receive the user setting for each object to be edited.

In operation 340, the web platform may change the material information on the object to be edited, by invoking the material information corresponding to the user setting input in operation 330. The web platform may change the material information on the object to be edited by invoking the material information corresponding to the user setting from a memory or a simulation server to a viewer or a configurator.

A method in which the web platform changes the material information on the object to be edited in the 3D garment displayed on the viewer according to the user setting will be described in more detail with reference to FIGS. 5 to 7 below.

In operation 350, the web platform may display a changed 3D garment on the viewer by performing rendering of applying the material information changed in operation 340 to the 3D garment. In this case, the changed 3D garment displayed in operation 350 may be visualized on the viewer to be distinguished from the 3D garment displayed on the viewer based on the material information loaded in operation 310.

The web platform may store the 3D garment rendered in operation 350 by applying the changed material information. The web platform may generate a file including the material information changed in operation 340 and the changed 3D garment with the changed material information applied. The web platform may provide the file to the server.

FIG. 4 illustrates an example of a screen 400 of a viewer, according to an example embodiment. The viewer may be a 3D viewer capable of displaying a 3D garment 410 rendered and displayed on the user terminal, and may correspond to the viewer 25 in FIG. 1.

The viewer includes icons or buttons 401 and 402 for annotation and/or editing of the 3D garment 410 on an upper right end of the screen 400. The button 401 may be, for example, an annotation button for explaining or annotating the 3D garment, and the button 402 may be a colorway icon for editing various pieces of material information including the color of the 3D garment.

The buttons 401 and 402 may be displayed as a set like a tool bar. The buttons 401 and 402 may be deactivated in case of a viewer state that simply displays the 3D garment. The buttons 401 and 402 may be activated when a user input event (e.g., a mouse hovering event or a mouse click event, etc.) corresponding to the 3D garment displayed on the viewer has occurred.

As the user input event for the 3D garment 410 displayed on the screen occurs, the screen 400 of the viewer may be changed to a configurator screen, on which editing may be performed, as described below with reference to FIG. 5.

As the user input event for the 3D garment 410 occurs, a speech balloon or tool tip showing supplementary explanation or help for each function or item of the configurator may be displayed on the screen 400 of the viewer.

The viewer may visualize a 3D garment of the original file (e.g., a 3D garment model for which a draping simulation has been completed in a simulation server) is reflected, and a 3D garment applied with material information changed by a configurator are displayed separately in a partial screen 420 on a lower end of the screen 400 of the viewer. The plurality of the 3D garments with the changed material information applied may be provided without limitation of the number.

For example, when the number of 3D garments, in which the material information changed by the configurator is reflected, is more than one, the user may search for the plurality of 3D garments using scroll arrows displayed on the screen 400 of the viewer. In this case, since a uniform resource locator (URL) is provided for each of 3D garments, the user may share information on the 3D garment, in which the changed material information is reflected, through the URL. In this case, information on files corresponding to the 3D garments displayed on the partial screen 420 may be displayed in a colorway list 430 displayed on a right side of the screen.

Among the pieces of the material information (colorway) displayed in the colorway list 430, the material information (colorway) belonging to the original file (e.g., a 3D garment model for which the draping simulation has been completed in the simulation server) may not be deleted. However, the user may change a name of the file of the material information generated by the configurator, which will be described below, or delete the file thereof.

The user may download a 3D garment file including material information (colorway) by selecting a download icon 403 displayed on an upper portion of the colorway list 430. In this case, the name of the 3D garment file may have a form of, for example, the name of the original file (e.g., the 3D garment model corresponding to the original 3D garment)+"(colorway)". Also, the extension of the 3D garment file may have a form of, for example, ".zprj".

A file list 440 may be displayed on a left tab of the screen 400 of the viewer. The file list 440 may include 3D garment model files including colorways belonging to the original file. The user may select and download any one original file included in the file list 440. In this case, in the colorway belonging to the original files included in the file list 440, a creator and upload date and time information may be displayed together with the information on the original file. In addition, the creator and the upload date and time information may not be changed, even if colorway information is changed.

FIG. 5 is a diagram illustrating a start screen of a configurator for editing material information on a 3D garment, according to an example embodiment. FIG. 5 illustrates a screen of a configurator including a material list 520, a color palette 530, a property list 540, and a colorway list 560 for editing material information on a 3D garment 510, according to an example embodiment.

When the user selects an “exit” button 501 marked with x on an upper right end of FIG. 5, the web platform may cancel all values of the material information input by the user and return to a basic state of the 3D viewer as shown in FIG. 4. Alternatively, when the user selects a “save” button 502 on the upper right end of FIG. 5, the web platform may store the material information selected or changed by the user as material information of the 3D garment 510.

The material list 520 may include, for example, a plurality of material items which may be set in response to a pattern, a fabric list, and a trim of the 3D garment, respectively. The material list 520 may include a plurality of material items (e.g., a fabric, a graphic, a button head, a zipper puller, a zipper stopper, a zipper slider, etc.) which may be set in response to an object to be edited of the 3D garment 510.

For example, when the user selects any one material item included in the material list 520 of the 3D garment 510, a “create” button 503 for generating the material information may be displayed on the screen. When the user selects the “create” button 503, the web platform may generate new material information. In this case, the generated material information may be added to the top of the colorway list 560 generated by the web platform, and a name of a file corresponding to the newly generated material information may be, for example, “New Colorway”. For example, when a file name (“New Colorway”) has already been generated, a file name in the form of “New Colorway+number” may be generated in response to the material information. In this case, the web platform may check whether there is a duplicate file name (“New Colorway+number”) in a current material list, and when there is no duplicate file name, the web platform may generate the file with the name (“New Colorway+number”).

According to an example embodiment, when the user selects the material information generated by the configurator, both the “save” button 502 and the “create” button 503 may be displayed as shown in the upper end right end of the FIG. 5. For example, when the user selects a specific point (a button or sleeve portion) in the 3D garment 510 by a mouse click or the like, the configurator may determine an object to be edited corresponding to the specific point of the 3D garment 510 as a button or sleeve portion, based on geometry information on the 3D garment model corresponding to the 3D garment 510.

The configurator may change various pieces of material information including a color in the unit of the determined object to be edited. For example, the user may select a pattern on a front side of the sleeve portion of the 3D garment 510 displayed on the screen and then change a color of the pattern on the front side thereof on the color palette 530. In this case, the user may change a color value in matmesh units for the selected object. Herein, “matmesh” may be understood as a mesh constituting a material.

For example, when a side surface of the 3D garment 510 has a certain area, the user may select the side surface and change material information.

When the user selects other material information, the user may select and change the matmesh of the material information.

The color palette 530 may be configured in the same way as an operation method for designating a background color. The color value designated by the user through the color palette 530 may be applied by being multiplied by a color and/or texture of the material information (e.g., the material information on the 3D garment model) of the original file.

The property list 540 may include, for example, various property items that may be set in relation to a color, such as opacity, roughness, intensity, and metalness. For example, a minimum value of each of the property items may be “0” and a maximum value thereof may be “100”.

The user may change the property related to the color selected in the color palette 530 through the property list 540. In this case, the configurator may change a color of a front sleeve portion of the 3D garment with a color set in the color palette 530 and a color property set through the property list 540. An initial value of the color palette 530 may be, for example, set to white (#ffffff), but is not limited thereto.

When the configurator is active, a URL may correspond to the material information on the 3D garment displayed on the screen.

When the user selects a “reset” button 550, the web platform may return a value of the material information selected by the user to the initial value of the material information. In this case, a range of the material information to be reset may correspond to the material information selected on the current screen, and values of the material information changed on a previous screen may be maintained.

For example, with the configurator active, if the user clicks on a colorway included in the colorway list 560, the colorway being edited, may be changed. A record changed on the previous screen may not be saved unless the user presses the “save” button 502 or the “create” button 503. For example, even when the user selects a colorway currently being changed, the colorway, which is being edited, may be changed.

A colorway (for example, a new color or pattern of clothing) created by a user using a configurator can be managed as a new version on the web platform. Alternatively, the user can download the created colorway to the local device as a .zproj file (a file format that can be edited in the local device’s software).

FIG. 6 is a diagram illustrating a method for a configurator to determine an object to be edited, according to an example embodiment. FIG. 6 illustrates a 3D garment 610, according to an exemplary embodiment.

The user may select an object to be edited (e.g., using a button 615) by selecting, for example, a specific point of the 3D garment 610 displayed on the screen or selecting any one material item displayed in a material list 620. When the button 615 is selected by the user, the configurator may display the material list 620 including material items corresponding to the button 615 on the screen.

The user may select the button 615 as the object to be edited, by clicking at least one of the material items included in the material list 620 displayed on the screen. For example, when the user selects any one object for editing included in the material list 520, an object for editing in front of others in the material list may be selected. In this case, an edge corresponding to the selected object to be edited may be highlighted.

Alternatively, the user may select an object to be edited, by selecting a specific point of the 3D garment 610 displayed on the viewer screen. When the user selects the specific point of the 3D garment 610, an object corresponding to the selected specific point may be determined as the object to be edited. The edge of the object corresponding to the specific point selected by the user may be highlighted. The configurator may display the highlighted edge of the object to be edited, to show the user that the object is determined as a target to be edited.

The user may rotate, move, enlarge, and reduce a view displayed on the screen, that is, the 3D garment 610 by adjusting a user interface 630 displayed on the screen.

The user may modify a color and color-related properties of the object to be edited selected in the 3D garment 610 using a color palette 640 displayed on the screen and a property list 650 for setting color-related properties.

FIG. 7 is a diagram illustrating an operation of a configurator when a mouse hovering event occurs in a 3D garment, according to an example embodiment. FIG. 7 illustrates a case in which a mouse hovering event of a user occurs with respect to a 3D garment 710 displayed on a screen.

For example, when the mouse hovering event of the user has occurred with respect to a specific point of the 3D garment 710 displayed on the screen, the configurator may highlight a surface of the object to be edited (e.g., a button 715) corresponding to the specific point where the mouse hovering event has occurred. In this case, in addition to the object to be edited where the hovering event has occurred, an item of the object to be edited included in a material list may also be highlighted.

When the user selects the object to be edited by clicking the highlighted button 715, the configurator may highlight a silhouette (line) 720 of the button 715.

When the user selects a material item corresponding to the button 715 in the material list 730, the item may be displayed in the material list 730. At this time, an edge of a first matmesh may be highlighted in all objects using the material on the viewer.

Figure 8:
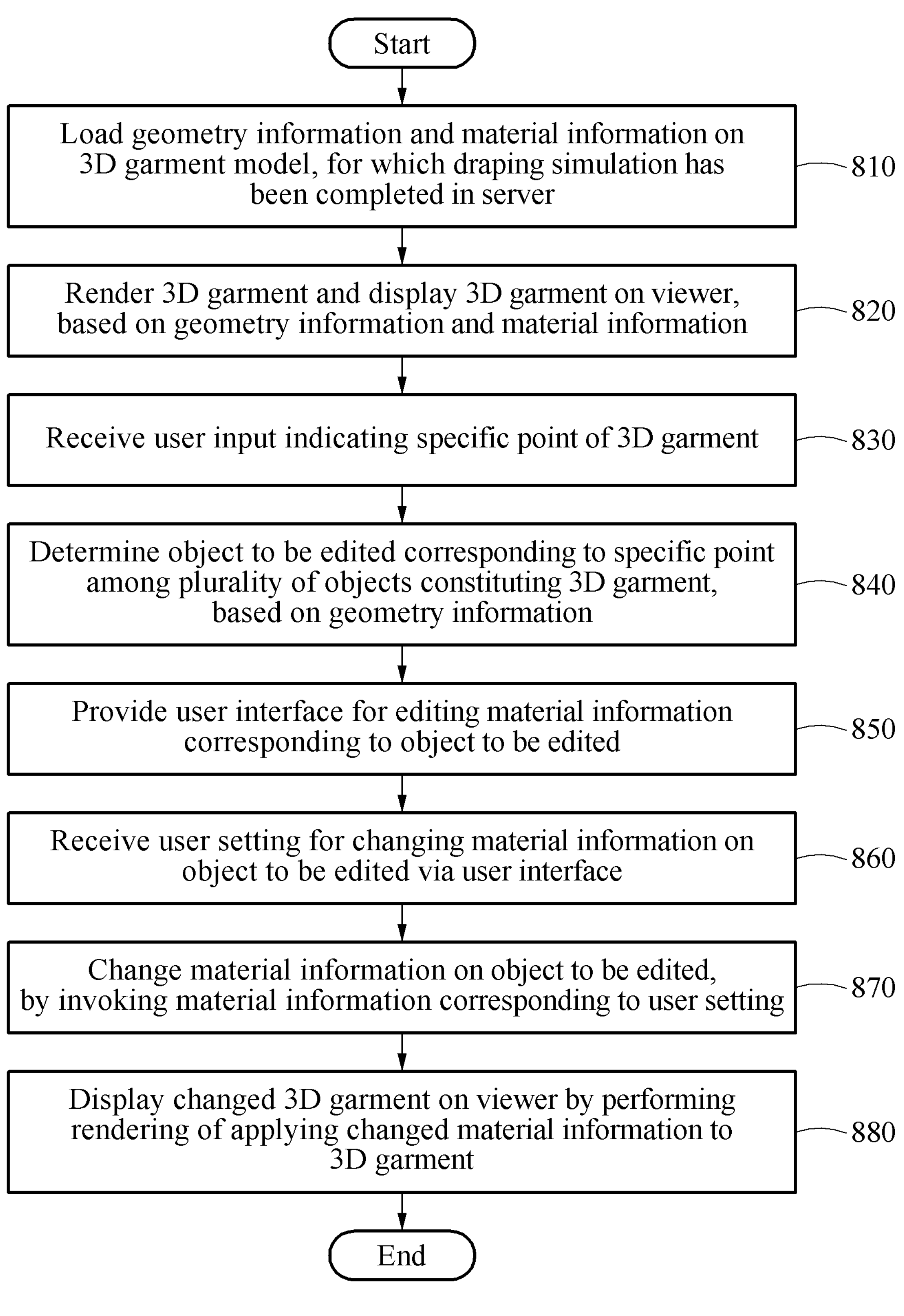
FIG. 8 is a flowchart illustrating an operating method of a web platform, according to another example embodiment.

FIG. 8 is a flowchart illustrating an operating method of a web platform according to another example embodiment. In the following example embodiments, operations may be performed sequentially, but not necessarily performed sequentially. For example, the order of the operations may be changed and at least two of the operations may be performed in parallel.

FIG. 8 illustrates a process in which a web platform drives a viewer through operations 810 to 880 according to an example embodiment. In operation 810, the web platform may load geometry information and material information on a 3D garment model, for which a draping simulation has been completed in a server (e.g., a simulation server). In operation 820, the web platform may render a 3D garment and display the 3D garment on a viewer, based on the geometry information and material information loaded in operation 810. In operation 830, the web platform may receive a user input indicating a specific point of the 3D garment displayed on the viewer in operation 820. In operation 840, the web platform may determine an object to be edited corresponding to the specific point among a plurality of objects constituting the 3D garment, based on the geometry information loaded in operation 810. In this case, the plurality of objects may include at least one of one or more patterns or one or more subsidiary materials. In operation 850, the web platform may provide an interface for editing material information corresponding to the object to be edited which is determined in operation 840. In operation 860, the web platform may receive a user setting for changing the material information on the object to be edited via the interface provided in operation 850. In operation 870, the web platform may change the material information on the object to be edited, by invoking the material information corresponding to the user setting received in operation 860. In operation 880, the web platform may display the changed 3D garment on the viewer by performing the rendering. In this case, the rendering may correspond to a process of applying the material information changed through operation 870 to the 3D garment.

Figure 9:
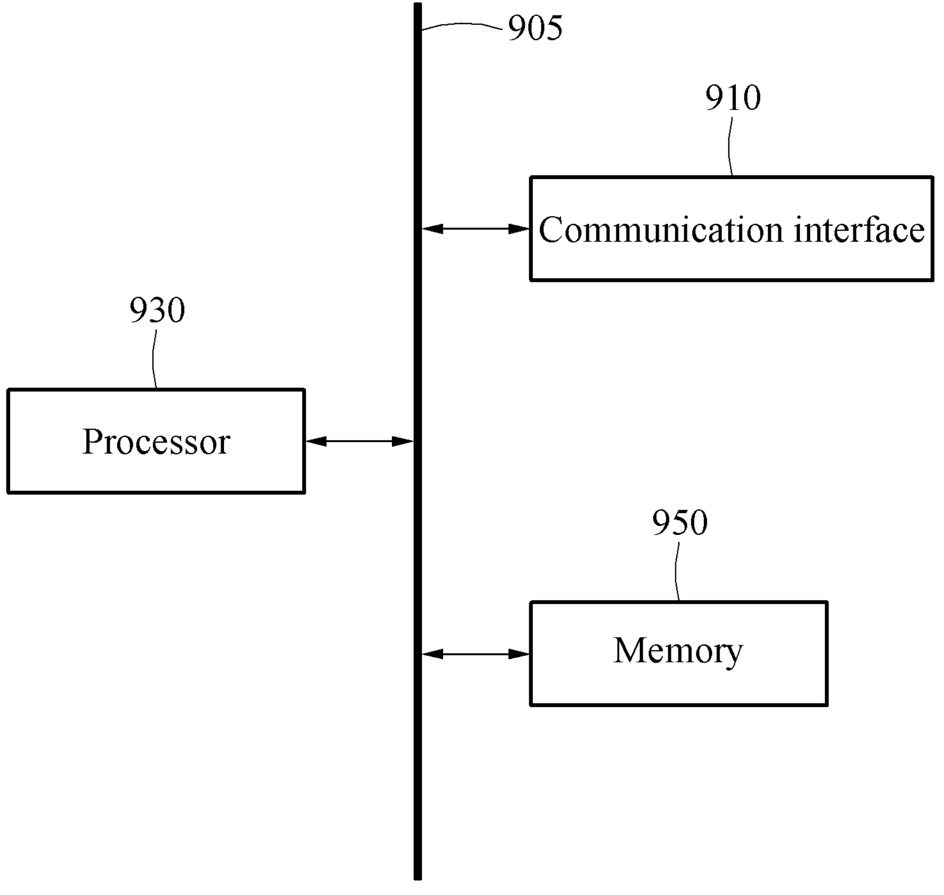
FIG. 9 is a block diagram of a web server providing a web platform, according to an example embodiment.

FIG. 9 is a block diagram of a web server providing a web platform according to an example embodiment. Referring to FIG. 9, a web server 900 may include a communication interface 910, a processor 930, and a memory 950. The communication interface 910, the processor 930, and the memory 950 may be connected to each other via a communication bus 905.

The communication interface 910 may receive geometry information and material information on a 3D garment model, for which a draping simulation has been completed in a server (e.g., the simulation server 110).

The processor 930 may render the 3D garment and display the 3D garment on the viewer, based on the geometry information and material information on the 3D garment model. The processor 930 may determine an object to be edited corresponding to a specific point among a plurality of objects constituting the 3D garment based on a user input indicating the specific point of the 3D garment. The plurality of objects may include, for example, at least one of one or more patterns or one or more subsidiary materials constituting a 3D garment, but is not limited thereto. The processor 930 may determine the object to be edited corresponding to the specific point among the plurality of objects constituting the 3D garment, based on the geometry information.

The processor 930 may receive a user setting for changing the material information on the object to be edited. The material information may include, for example, a color of a 3D garment, texture of fabric of the 3D garment, a light effect of the fabric, a pattern of the fabric, a position and a size of a pattern displayed on the fabric, a type of a subsidiary material attached to the 3D garment, a position and a size of the subsidiary material, and the like, and is not limited thereto.

The processor 930 may provide a user interface for editing material information corresponding to the object to be edited on the viewer, and may receive a user setting for changing material information on the object to be edited via the user interface. The user interface may include, for example, a material list including a plurality of material items that may be set in response to the object to be edited.

The processor 930 may change the material information on the object to be edited, based on the material information corresponding to the user setting. The processor 930 may display a changed 3D garment on the viewer by performing rendering of applying the changed material information to the 3D garment.

The memory 950 may store geometry information and material information on the 3D garment model received via the communication interface 910. The memory 950 may store a result of rendering performed by the processor 930.

Further, the memory 950 may store a variety of information generated in the processing process of the processor 930 described above. In addition, the memory 950 may store a variety of data and programs. The memory 950 may include, for example, a volatile memory or a non-volatile memory. The memory 950 may include a high-capacity storage medium such as a hard disk to store a variety of data.

In addition, the processor 930 may perform at least one of the methods described with reference to FIG. 1 to 8 or an algorithm corresponding to at least one of the methods. The processor 930 may be a hardware-implemented web server having a circuit that is physically structured to execute desired operations. The desired operations may include, for example, code or instructions included in a program. The processor 930 may be implemented as, for example, a central processing unit (CPU), a graphics processing unit (GPU), or a neural network processing unit (NPU). The hardware-implemented display device may include, for example, a microprocessor, a central processing unit (CPU), a processor core, a multi-core processor, a multiprocessor, an application-specific integrated circuit (ASIC), and a field-programmable gate array (FPGA).

The processor 930 may execute a program and control the web server 900. A code of the program executed by the processor 930 may be stored in the memory 950.

The methods according to the above-described example embodiments may be recorded in non-transitory computer-readable media including program instructions to implement various operations of the above-described example embodiments. The non-transitory computer-readable media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The hardware devices described above may be configured to act as one or more software modules in order to perform the operations of the example embodiments, or vice versa.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, or computer storage medium or device capable of providing instructions or data to or being interpreted by the processing device. The software may also be distributed over network coupled computer systems so that the software is stored and executed in a distributed fashion. The software and data may be stored by one or more non-transitory computer readable recording mediums.

While this disclosure includes specific example embodiments, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of simulating a garment, the method comprising:

receiving a simulation result of draping a three-dimensional (3D) garment and first material information of an object of the 3D garment, by a web server;

rendering, by the web server, a first version of the 3D garment according to the simulation result and the first material information of the object of the 3D garment to generate a first rendering result;

sending the first rendering result to a user terminal for displaying the first version of the 3D garment on the user terminal;

receiving, via the user terminal, a user input indicating the object of the 3D garment for editing and a user setting for changing the first material information to second material information;

rendering, by the web server, a second version of the 3D garment by reusing the simulation result and applying the second material information of the object of the 3D garment to generate a second rendering result; and sending the second rendering result to the user terminal for displaying the second version of the 3D garment on the user terminal.

2. The method of claim 1, wherein the first and second material information comprises:

at least one of a light effect on fabric of the 3D garment, a position and a size of a pattern displayed on the fabric of the 3D garment, a type of a supplemental material attached to the 3D garment, or a position and a size of the supplemental material.

3. The method of claim 1, wherein the simulation result comprises:

geometry information of the 3D garment.

4. The method of claim 1, wherein the object comprises:

a pattern or a supplemental material constituting the 3D garment.

5. The method of claim 1, wherein the user input indicates a specific point of the 3D garment that corresponds to the object of the 3D garment for editing.

6. The method of claim 5, wherein the specific point is determined based on positions of vertices of polygons included in a mesh constituting the 3D garment.

7. The method of claim 1, further comprising:

causing one of objects of the 3D garment over which a mouse point hovers to be displayed on the user terminal in a distinctive manner relative to other objects of the 3D garment.

8. The method of claim 1, further comprising:

causing a silhouette of the object for editing to be displayed on the user terminal in a distinctive manner relative to other objects of the 3D garment.

9. The method of claim 1, wherein the user setting is received via a user interface on the user terminal for editing the first material information to the second material information.

10. The method of claim 9, wherein the user interface displays a material list comprising a plurality of material items to be selected for the object.

11. The method of claim 1, further comprising:

storing the second version of the 3D garment rendered using the second material information.

12. The method of claim 1, further comprising:

generating a file comprising the second version of the 3D garment and the second material information; and sending the file to a simulation server that generated the simulation result.

13. A non-transitory computer-readable storage medium storing instructions thereon, the instructions when executed by a processor of a web server cause the processor to:

receive a simulation result of draping a three-dimensional (3D) garment and first material information of an object of the 3D garment;

render a first version of the 3D garment according to the simulation result and the first material information of the object of the 3D garment to generate a first rendering result;

send the first rendering result to a user terminal for displaying the first version of the 3D garment on the user terminal;

receive, via the user terminal, a user input indicating the object of the 3D garment for editing and a user setting for changing the first material information to second material information;

render a second version of the 3D garment by reusing the simulation result and applying the second material information of the object of the 3D garment to generate a second rendering result; and send the second rendering result to the user terminal for displaying the second version of the 3D garment on the user terminal.

14. The non-transitory computer-readable storage medium of claim 13, wherein the first and second material information comprises:

at least one of a light effect on fabric of the 3D garment, a position and a size of a pattern displayed on the fabric of the 3D garment, a type of a supplemental material attached to the 3D garment, or a position and a size of the supplemental material.

15. The non-transitory computer-readable storage medium of claim 13, wherein the simulation result comprises:

geometry information of the 3D garment.

16. The non-transitory computer-readable storage medium of claim 13, wherein the object comprises:

a pattern or a supplemental material constituting the 3D garment.

17. The non-transitory computer-readable storage medium of claim 13, wherein the user input indicates a specific point of the 3D garment that corresponds to the object of the 3D garment for editing.

18. The non-transitory computer-readable storage medium of claim 17, wherein the specific point is determined based on positions of vertices of polygons included in a mesh constituting the 3D garment.

19. The non-transitory computer-readable storage medium of claim 13, wherein the user setting is received via a user interface on the user terminal for editing the first material information to the second material information.

20. The non-transitory computer-readable storage medium of claim 13, further storing instructions that cause the processor to:

generate a file comprising the second version of the 3D garment and the second material information; and send the file to a simulation server that generated the simulation result.

21. A system for simulating a garment, comprising:

a first computing device configured to simulate changes in meshes of a three-dimensional (3D) garment when draped to generate a simulation result; and a second computing device configured to: receive the simulation result and first material information of an object of the 3D garment from the first computing device;

render a first version of the 3D garment according to the simulation result and the first material information of the object of the 3D garment to generate a first rendering result; send the first rendering result to a user terminal for displaying the first version of the 3D garment on the user terminal; receive, via the user terminal, a user input indicating the object of the 3D garment for editing and a user setting for changing the first material information to second material information; render a second version of the 3D garment according to by reusing the simulation result and applying the second material information of the object of the 3D garment to generate a second rendering result; and send the second rendering result to the user terminal for displaying the second version of the 3D garment on the user terminal.

* * * * *